(12) United States Patent
Kawasaki et al.

(10) Patent No.: US 12,086,580 B2
(45) Date of Patent: Sep. 10, 2024

(54) INFORMATION PROCESSING DEVICE, DELIVERY SERVER, AND FUNCTION EXECUTION METHOD

(71) Applicant: SONY INTERACTIVE ENTERTAINMENT INC., Tokyo (JP)

(72) Inventors: Takuya Kawasaki, Tokyo (JP); Masaki Takahashi, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 128 days.

(21) Appl. No.: 17/438,957

(22) PCT Filed: Mar. 23, 2020

(86) PCT No.: PCT/JP2020/012617
§ 371 (c)(1),
(2) Date: Sep. 14, 2021

(87) PCT Pub. No.: WO2020/203392
PCT Pub. Date: Oct. 8, 2020

(65) Prior Publication Data
US 2022/0147339 A1    May 12, 2022

(30) Foreign Application Priority Data
Mar. 29, 2019   (JP) .................................. 2019-068190

(51) Int. Cl.
*G06F 8/65*  (2018.01)
*A63F 13/77*  (2014.01)
*G06F 8/71*  (2018.01)

(52) U.S. Cl.
CPC .............. *G06F 8/65* (2013.01); *A63F 13/77* (2014.09); *G06F 8/71* (2013.01)

(58) Field of Classification Search
CPC .............. G06F 8/65; G06F 8/71; A63F 13/77
USPC ........................................................ 717/168
See application file for complete search history.

(56) References Cited

U.S. PATENT DOCUMENTS

| 10,860,305 | B1 * | 12/2020 | Harland | .............. | H03K 19/177 |
| 2004/0083471 | A1 * | 4/2004 | Nam | .......................... | G06F 8/65 |
| | | | | | 717/171 |
| 2018/0189050 | A1 * | 7/2018 | Salapura | .................. | G06F 8/65 |
| 2019/0332370 | A1 * | 10/2019 | Christiansen | ............. | G06F 8/65 |
| 2022/0100490 | A1 * | 3/2022 | Hwang | ..................... | G06F 8/65 |

FOREIGN PATENT DOCUMENTS

| JP | 2003228486 A | 8/2003 |
| JP | 2005-092379 A | 4/2005 |
| JP | 2009-205440 A | 9/2009 |
| JP | 2009-272966 A | 11/2009 |
| JP | 2011253430 A | 12/2011 |
| JP | 2014109790 A | 6/2014 |
| JP | 2016-001391 A | 1/2016 |
| WO | 2014111984 A1 | 7/2014 |

OTHER PUBLICATIONS

English translation of JP20030322414. (Year: 2005).*
Drawings for JP20030322414 (Year: 2005).*
Hicks et al, "Dynamic Software Updating", 2005, [Online], pp. 1049-1096, [Retrieved fron internet on Apr. 12, 2024], <chrome-extension://efaidnbmnnnibpcajpcglclefindmkaj/https://dl.acm.org/doi/pdf/10.1145/1108970.1108971> (Year: 2005).*
International Search Report and Written Opinion mailed Jun. 23, 2020, from PCT/JP2020/012617, 9 sheets.
Notice of Reasons for Refusal dated Sep. 27, 2022, from Japanese Patent Application No. 2019-068190, 3 sheets.
Notice of Reasons for Refusal dated Mar. 22, 2023, from Japanese Patent Application No. 2019-068190, 3 sheets.

* cited by examiner

*Primary Examiner* — S. Sough
*Assistant Examiner* — Zengpu We
(74) *Attorney, Agent, or Firm* — XSENSUS LLP

(57) ABSTRACT

An information processing device 10 accesses a first region 110 for recording software that implements a plurality of functions and a second region 120 for recording an update file for each of the functions of the software. If an update file for a function to be executed of the software is recorded in the second region 120, a function executor 102 is configured to execute the update file.

9 Claims, 10 Drawing Sheets

INFORMATION PROCESSING DEVICE, DELIVERY SERVER, AND FUNCTION EXECUTION METHOD

TECHNICAL FIELD

The present invention relates to a technology that updates a function of software.

BACKGROUND ART

PTL 1 discloses an information processing system including a first information processing device that is stationary and to be installed at home and a second information processing device such as a mobile phone. When the first information processing device automatically downloads new system software from a software server, a notification server gives a notification to the second information processing device of a user, indicating that the first information processing device is in a state of being able to perform system update. The user then operates the second information processing device to send an execution instruction for update to the first information processing device, and the first information processing device obtains the execution instruction for update and updates the system software.

CITATION LIST

Patent Literature

[PTL 1]
Japanese Patent Laid-Open No. 2016-1391

SUMMARY

Technical Problem

An operating system is software equipped with functions for basic management and control of an information processing device and functions that are to be used in common by a number of applications. Recent system software often includes, in addition to the operating system, applications that implement a variety of functions that are helpful for a user. For example, system software for game devices includes a friend application that presents the current state of a friend, a store application that offers a graphical user interface (GUI) for purchasing a game online, etc. These applications are to be incorporated in system software to encourage use by all the users and an application in system software is hereinafter referred to also as a "system application."

In related art, system software is usually updated by fully replacing the installed old system software with new system software. A data size of the system software is large and thus the update takes a long time, so that a system is not frequently updated. Accordingly, system update can actually be executed only as frequently as several times a year, and a system application is likewise updated only at such a frequency.

In view of the above, an object of the present invention is to provide a technology that efficiently updates a function of software.

Solution to Problem

To solve the above-described problem, an aspect of the present invention is an information processing device configured to access a first region for recording software that implements a plurality of functions and a second region for recording an update file for each of the functions of the software. The information processing device includes a function executor configured to execute the functions of the software. If an update file for a function to be executed is recorded in the second region, the function executor is configured to execute the update file.

Another aspect of the present invention is a delivery server configured to deliver a file for software to an information processing device. The delivery server includes a first delivery unit configured to deliver an update package for the software that implements a plurality of functions, a management unit configured to obtain version information regarding the installed software from the information processing device, and a second delivery unit configured to deliver an update file for each of the functions of the software according to the obtained version information.

Still another aspect of the present invention is a method of executing a function of software in an information processing device, the information processing device being configured to access a first region for recording the software that implements a plurality of functions and a second region for recording an update file for each of the functions of the software. The method includes executing, if an update file for a function to be executed is recorded in the second region, the update file.

It should be noted that any combinations of the above-described components and conversions of expression of the present invention between a method, a device, a system, a recording medium, a computer program, and the like are also effective as aspects of present invention.

DESCRIPTION OF EMBODIMENT

Figure 1:
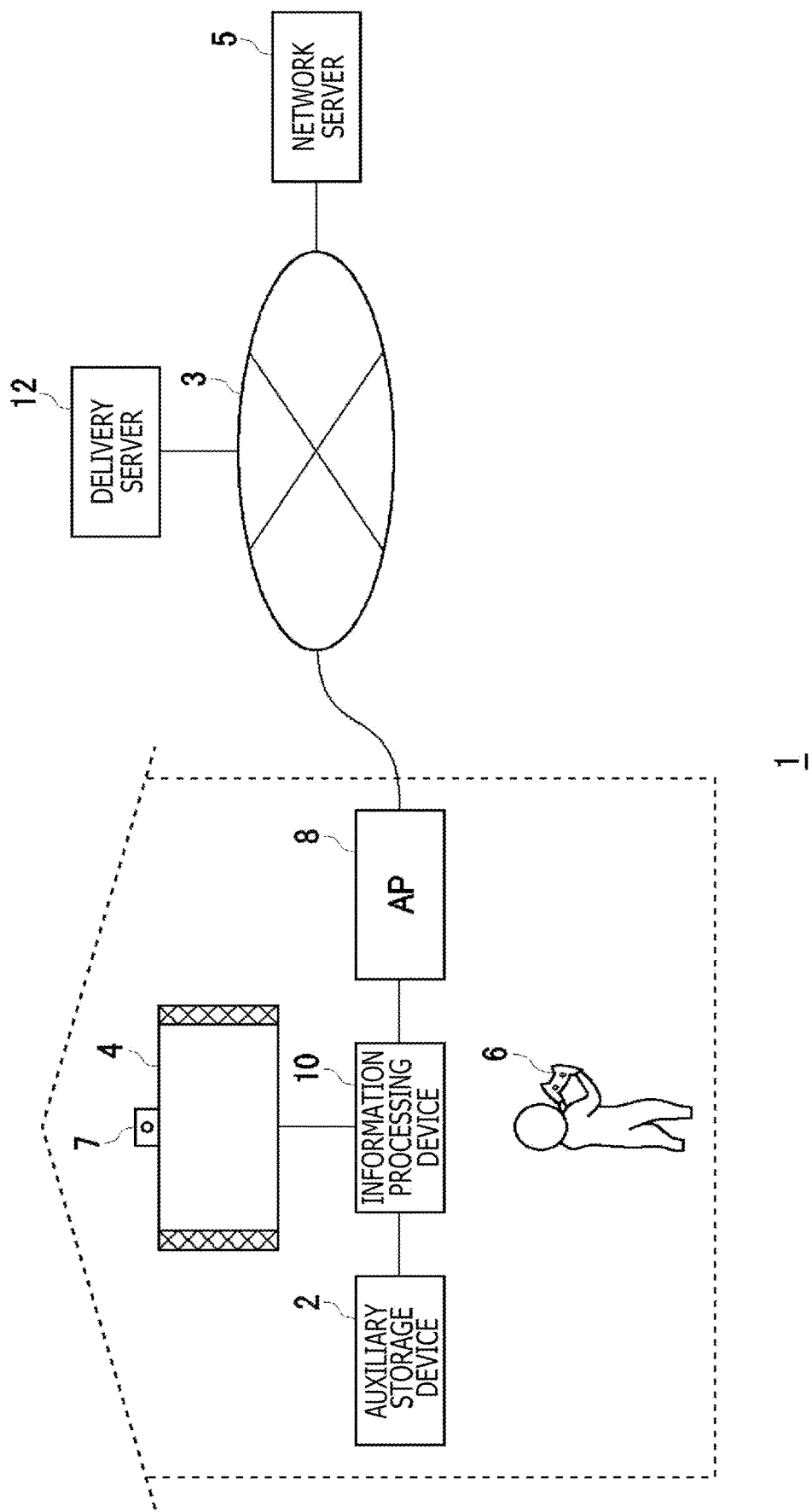
FIG. 1 illustrates an information processing system according to an embodiment.
Figure 10:
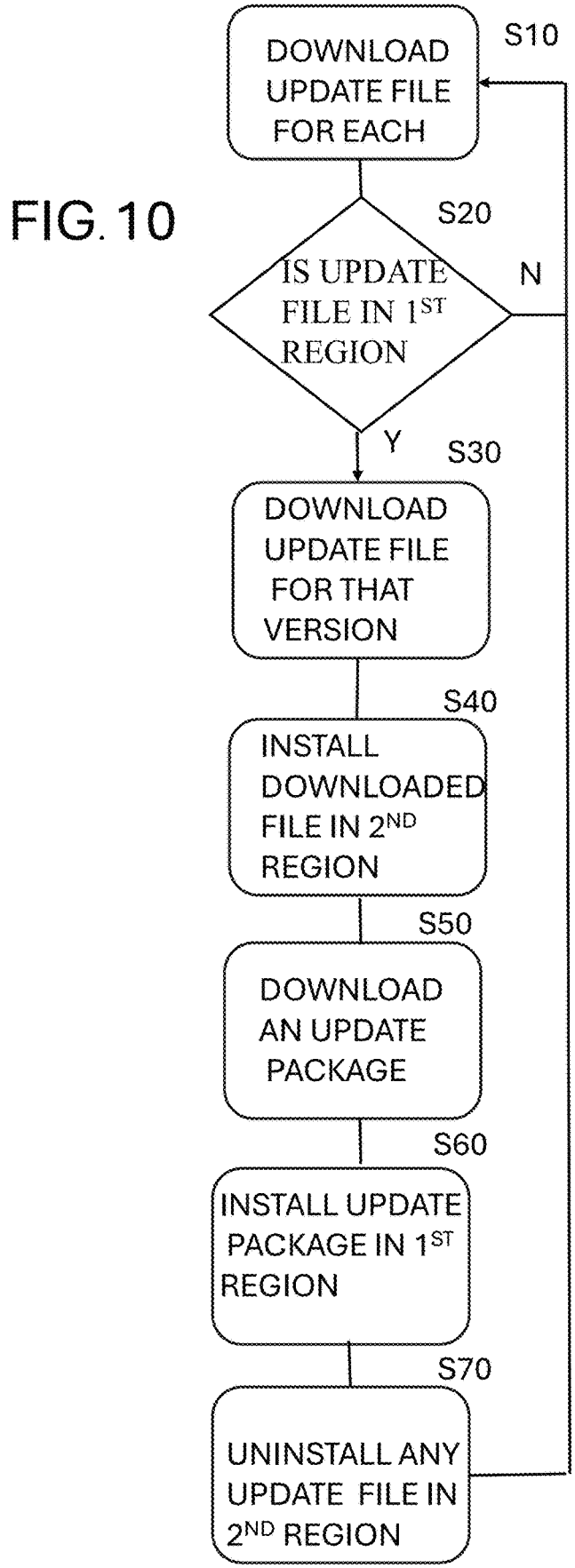
FIG. 10 illustrates a flowchart for updating software.

FIG. 1 illustrates an information processing system 1 according to an embodiment of the present invention. The information processing system 1 includes an information processing device 10, a network server 5, and a delivery server 12 that delivers a file for software update, which are connected to each other through a network 3 such as the Internet or a local area network (LAN). An access point (hereinafter, referred to as an "AP") 8 functions as a wireless access point and a router. The information processing device 10 is connected to the AP 8 wirelessly or by wire, the information processing device 10 being connected to the network server 5 and the delivery server 12 on the network 3 for communication. FIG. 10 illustrates a flowchart for updating software including operations S10 to S70.

The information processing device 10 is connected to an input device 6, which is to be operated by a user, wirelessly or by wire. The input device 6 outputs operation information from the user to the information processing device 10. The information processing device 10 reflects the operation information from the input device 6 in processing of an operating system or an application and causes an output device 4 to output a processing result. The information processing device 10 may be a terminal device such as a game device that executes a game application or a personal computer, and the input device 6 may be a device, such as a game controller, that supplies operation information from the user to the information processing device 10.

The input device 6 includes a plurality of input units such as a plurality of push-type operation buttons, an analog stick that enables input of an analog quantity, and a rotary button. A camera 7 serving as an image-capturing device is provided near the output device 4 to capture an image of space in the vicinity of the output device 4. FIG. 1 illustrates an example where the camera 7 is attached to a top of the output device 4. However, the camera 7 may be provided on a side of the output device 4. In either case, the camera 7 is provided at a position for the camera 7 to be able to capture an image of a user who plays a game in front of the output device 4. The camera 7 may be a stereo camera.

An auxiliary storage device 2, which is a mass storage device such as a hard disk drive (HDD) or a solid state drive (SSD), may be a built-in storage device, or an external storage device that is to be connected to the information processing device 10 via a universal serial bus (USB) or the like. The output device 4 may be a television set including a display that outputs an image and a speaker that outputs sound or may be a head mounted display. The output device 4 may be connected to the information processing device 10 by a cable or wirelessly.

The network server 5, which is maintained and managed by an administrator of the information processing system 1, provides a network service to the user of the information processing system 1. The network server 5 manages a network account for user identification, and the user signs in to the network service provided by the network server 5 with the network account. When signing in to the network service through the information processing device 10, the user can receive a file of system software delivered from the delivery server 12.

The delivery server 12 holds an update package for system software, an update file for a system application that implements a function provided by the system software, etc., and delivers them to the information processing device 10 in response to a download request from the information processing device 10. For example, the information processing device 10 may periodically inquire of the delivery server 12 whether or not there is any file to download and, if any, send a download request to the delivery server 12 to automatically download a target file (S10). Alternatively, the delivery server 12 may send, when a new update package or an update file becomes ready for delivery, a notification to that effect to the information processing device 10, and the information processing device 10 may send a download request to the delivery server 12 to automatically download the target file.

The update package is new system software for fully replacing old system software installed on the information processing device 10. The update package, which is the system software itself, includes an updated operating system and a plurality of system applications that are to operate under an environment of the updated operating system. Version information is given to the system software, and the system software is managed based on the version information. The delivery server 12 delivers the update package to the information processing device 10 as frequently as, for example, several times a year.

The update file for a system application, which is a program file for updating a system application installed on the information processing device 10, includes a fix program and a patch file. The system software of the embodiment includes a plurality of system applications such as a friend application, and a store application and the system applications are developed independently of each other by respective different developers. When creating update files for the system applications, the developers upload the update files in a state of being able to be delivered to the delivery server 12. The delivery server 12 delivers the undelivered update files to the information processing device 10.

Figure 2:
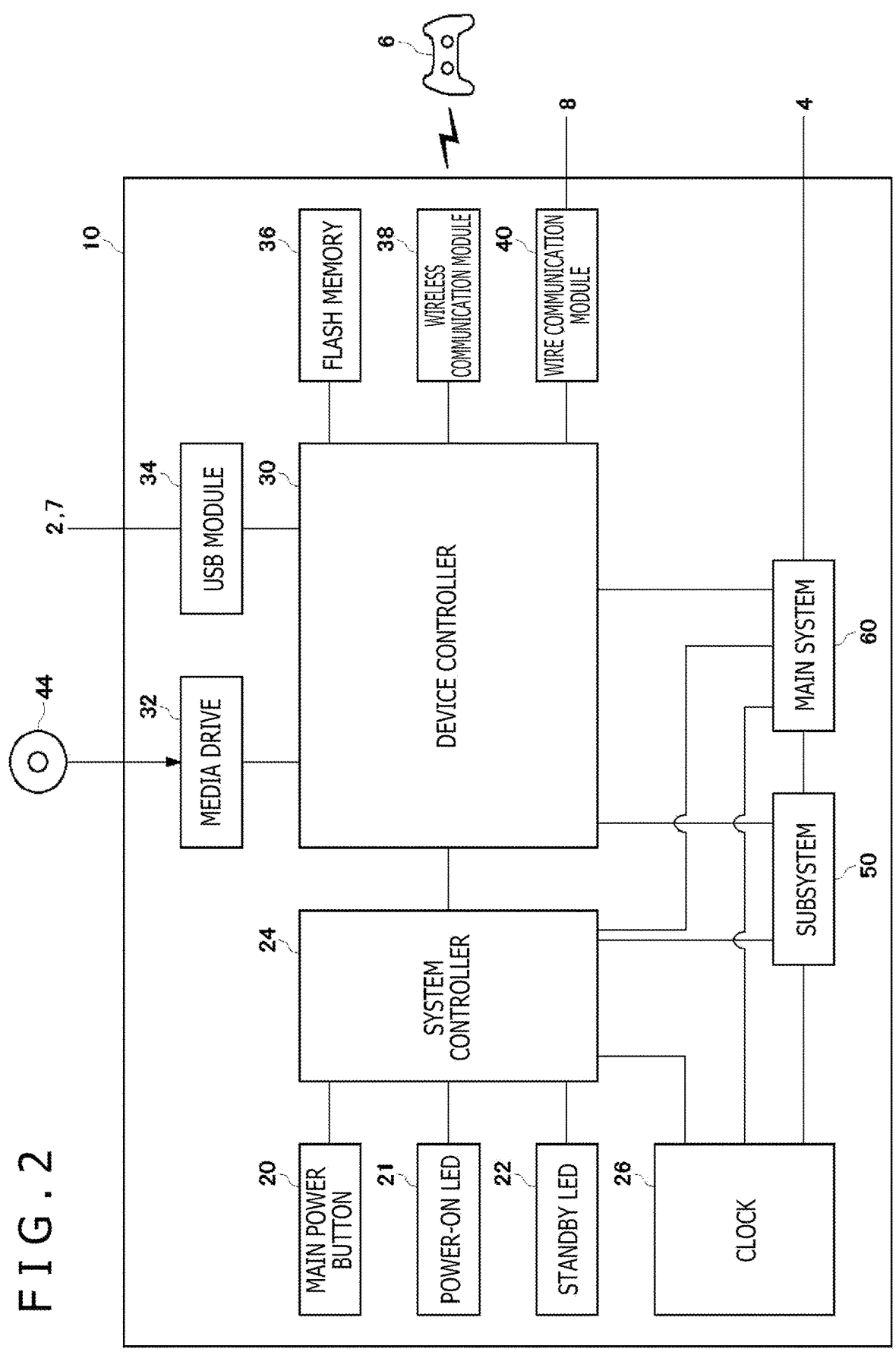
FIG. 2 illustrates a hardware configuration of an information processing device.

FIG. 2 illustrates a hardware configuration of the information processing device 10. The information processing device 10 includes a main power button 20, a power-on light emitting diode (LED) 21, a standby LED 22, a system controller 24, a clock 26, a device controller 30, a media drive 32, a USB module 34, a flash memory 36, a wireless communication module 38, a wire communication module 40, a subsystem 50, and a main system 60.

The main system 60 includes a main central processing unit (CPU), a memory serving as a main storage device and a memory controller, a graphics processing unit (GPU), etc. The GPU is used mainly for calculation processing of a game application. These functions are configured as a system-on-chip and may be provided on a single chip. The main CPU has a function to execute system software recorded in the auxiliary storage device 2 to execute a game application recorded in the auxiliary storage device 2 or a read only memory (ROM) medium 44.

While including a sub-CPU, a memory serving as a main storage device and a memory controller, etc., the subsystem 50 includes no GPU and thus has no function to execute a game application. The number of circuit gates of the sub-CPU is smaller than the number of circuit gates of the main CPU, and a power consumption for operation of the sub-CPU is smaller than a power consumption for operation of the main CPU. The sub-CPU, which operates even while the main CPU is on standby, is limited in terms of processing functions thereof in order that the power consumption is reduced to a low level.

The main power button 20, which is a button for the user to input an operation, is provided in a front surface of a housing of the information processing device 10, the main power button 20 being operated to turn on or off power supply to the main system 60 of the information processing device 10. The power-on LED 21 is lit up in response to the main power button 20 being turned on, and the standby LED 22 is lit up in response to the main power button 20 being turned off.

The system controller 24 detects the main power button 20 being pressed by the user. If the main power button 20 is pressed with a main power source being off, the system controller 24 obtains the pressing operation as an "ON instruction," whereas, if the main power button 20 is pressed with the main power source being on, the system controller 24 obtains the pressing operation as an "OFF instruction."

The clock 26, which is a real-time clock, generates current date and time information and delivers it to the system controller 24, the subsystem 50, and the main system 60.

The device controller 30 is configured as a large-scale integrated circuit (LSI) that causes information to be sent and received between devices in the same manner as a southbridge. As illustrated, the device controller 30 is connected to devices such as the system controller 24, the media drive 32, the USB module 34, the flash memory 36, the wireless communication module 38, the wire communication module 40, the subsystem 50, and the main system 60. The device controller 30 absorbs a difference in electrical properties and a difference in data transfer speed between the devices, controlling a timing for data transfer.

The media drive 32 is a drive device in which the ROM medium 44 with an application such as a game recorded therein is installed to be driven and that reads a program, data, or the like from the ROM medium 44. The ROM medium 44 is a read-only recording medium such as an optical disc, a magneto-optical disc, or a Blu-ray Disc.

The USB module 34 is a module that is to be connected to an external device through a USB cable. The USB module 34 may be connected to the auxiliary storage device 2 and the camera 7 through a USB cable. The flash memory 36 is an auxiliary storage device that serves as an internal storage. The wireless communication module 38 wirelessly communicates with, for example, the input device 6 by a communication protocol such as a Bluetooth (registered trademark) protocol or an IEEE802.11 protocol. It should be noted that the wireless communication module 38 may be compatible with a digital mobile phone system. The wire communication module 40, which communicates with an external device by wire, is connected to the network 3 via the AP 8.

Figure 3:
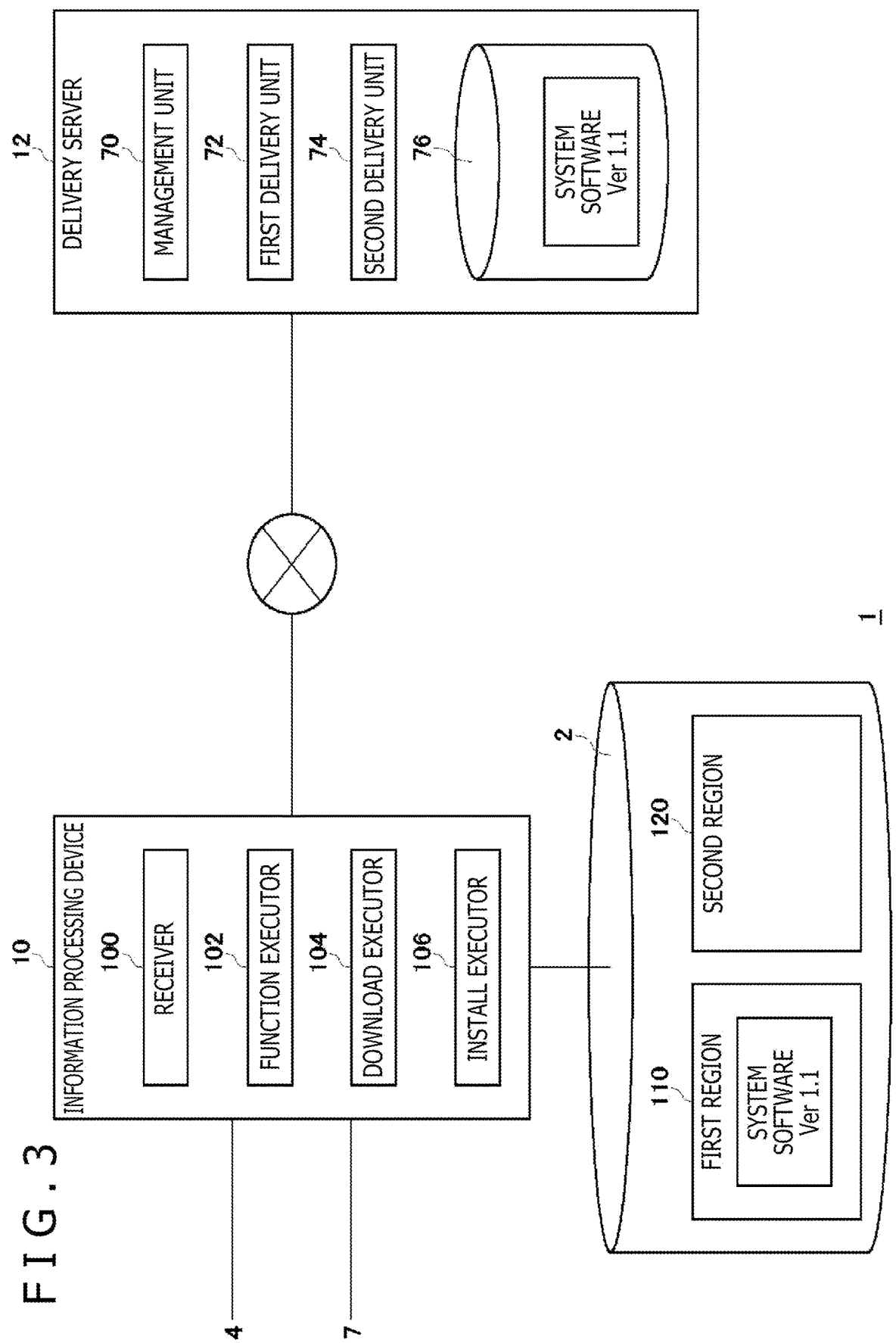
FIG. 3 illustrates a functional block of the information processing device.

FIG. 3 illustrates a functional block of the information processing device 10. The information processing device 10 includes a receiver 100, a function executor 102, a download executor 104, and an install executor 106. These functions are implemented in the main system 60. The auxiliary storage device 2 has a first region 110 for recording system software and a second region 120 for recording an update file for a function of the system software. The first region 110 and the second region 120 are different partitions in the auxiliary storage device 2, or storage regions logically divided from each other. The information processing device 10 accesses the first region 110 and the second region 120 to execute the function of the system software.

The receiver 100 receives the operation information regarding operation on the input device 6 by the user. The function executor 102 executes the function of the system software. The download executor 104 downloads a file for function update of the system software from the delivery server 12, and the install executor 106 installs the downloaded file in the auxiliary storage device 2.

The delivery server 12, which includes a management unit 70, a first delivery unit 72, a second delivery unit 74, and a storage device 76, delivers the file of the system software to the information processing device 10. The management unit 70 obtains a file download request from the information processing device 10. The first delivery unit 72 delivers an update package for the system software. The second delivery unit 74 delivers the update file for each function of the system software. The storage device 76 holds the update package for the system software and an update file for a system application. It should be noted that the storage device 76 may hold the update file for the system application for each version of the system software.

These components can be implemented by, if being hardware components, any CPU, memory, program loaded in the memory, storage, etc., in a computer. However, a block of functions implemented by combination thereof is drawn here. Accordingly, it will be understood by those skilled in the art that the block of these functions can be implemented in various manners by hardware only, software only, or combination thereof.

In the auxiliary storage device 2 of the embodiment, system software is to be recorded in the first region 110. The first region 110 is partitioned as a user-inoperable storage region. The user cannot thus uninstall the system software recorded in the first region 110. The first region 110 can be updated only with the update package for the system software and is prohibited from being written by any other method for robustness of the system.

In contrast, an update file for an application included in the system software is to be recorded in the second region 120. Unlike the first region 110, the second region 120 is partitioned as a user-operable storage region. The user can thus manually uninstall the update file installed in the second region 120. In addition, an old update file may be automatically uninstalled each time a new update file is downloaded.

As is understood from the above, in the auxiliary storage device 2, system software is recorded in the user-inoperable first region 110 for robustness of the system, and an update file for an application is recorded in the writable second region 120 to allow the application to be executed in a latest state.

Description will be made below on a process for updating a file of system software. In FIG. 3, the storage device 76 of the delivery server 12 holds a package for latest version 1.1 system software for delivery, and the same version 1.1 system software is installed in the first region 110 of the auxiliary storage device 2. Thus, the information processing device 10 is installed with the latest system software.

Figure 4:
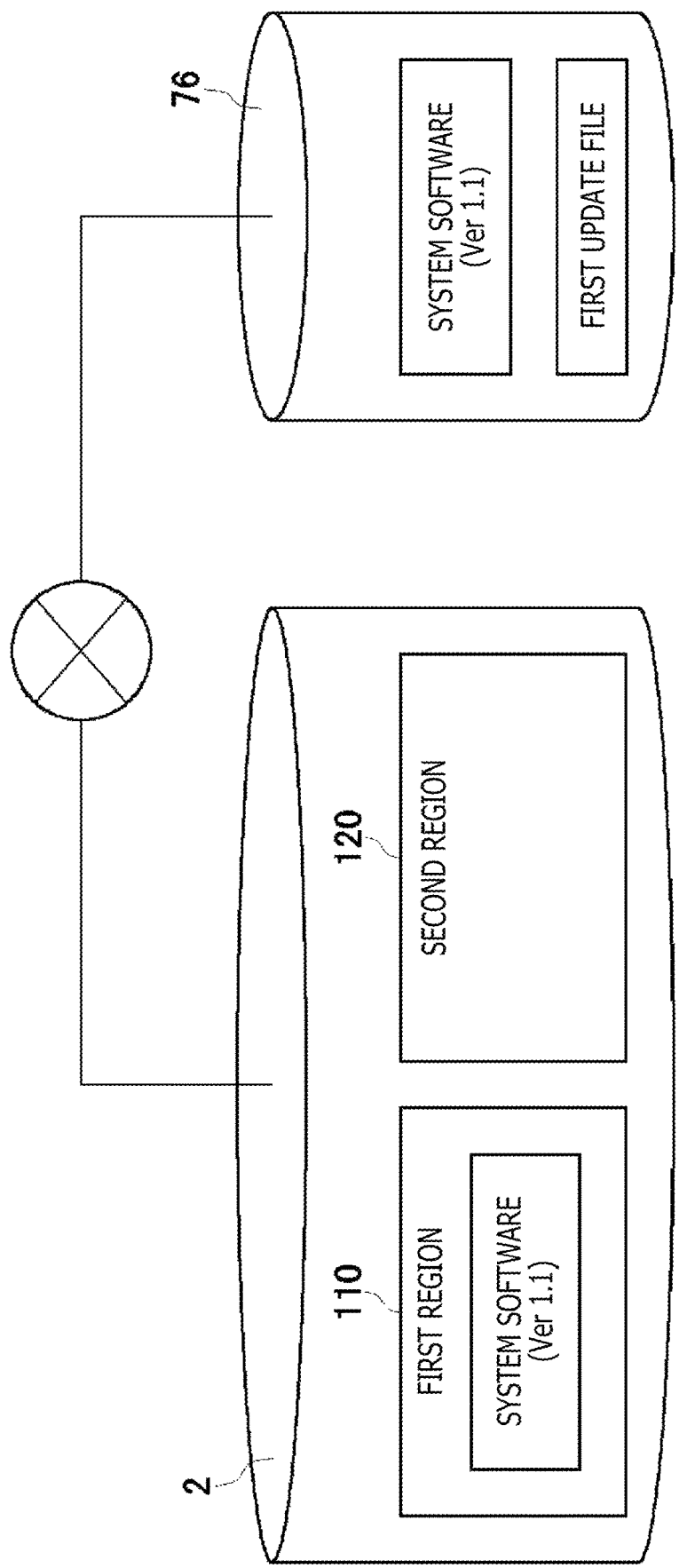
FIG. 4 illustrates a state where a first update file is held in a storage device.

FIG. 4 illustrates a state where a first update file for a system application is held in the storage device 76 of the delivery server 12. At this time, no update file is recorded in the second region 120 of the auxiliary storage device 2.

The storage device 76 holds a latest update file for a system application. It should be noted that, unless the system application is updated, no update file for the application exists in the storage device 76. Although the system software includes a plurality of system applications, description will be made below on update of a specific system application (referred to as a "system application A").

When creating a first update file for the system application A, a developer of the system application A uploads the first update file to the storage device 76 for delivery. It should be noted that the storage device 76 holds only the latest update file. Thus, if the developer creates a second update file after uploading the first update file to the storage device 76 for delivery, the second update file will be uploaded for delivery after the first update file is deleted from the storage device 76. This causes the storage device 76 to hold only the latest update file for the system application A.

It should be noted that the storage device 76 holds the latest update file for the system application for each version of the system software. For example, assume that version 1.0 system software older than the version 1.1 exists. In this case, the storage device 76 holds a latest update file for the system application A that is to operate with a version 1.0 operating system (OS) and a latest update file for the system application A that is to operate with a version 1.1 OS.

The download executor 104 periodically inquires of the delivery server 12 whether or not there is any file to download. The download executor 104 may make the inquiry at a predetermined time (for example, 2 a.m.) in a day. In making the inquiry, the download executor 104 notifies the delivery server 12 of version information (Ver 1.1) regarding installed system software.

When obtaining the inquiry including the version information (Ver 1.1), the management unit 70 searches the storage device 76 for a latest update file for a system application that is to operate with the version 1.1 OS. When recognizing the presence of the first update file for the system application A, the management unit 70 notifies the information processing device 10 of a hash value of the first update file along with identification information regarding the system application A.

In the information processing device 10, the download executor 104 obtains the notified information and searches for the presence of an update file for the system application A having the notified hash value in the second region 120. In the state illustrated in FIG. 4, there is no update file recorded in the second region 120, which means that there is no update file for the system application A. When ascertaining that there is no update file with the hash value notified from the delivery server 12 in the second region 120, the download executor 104 sends a download request for the update file to the delivery server 12.

The management unit 70 obtains the download request, and the second delivery unit 74 delivers the first update file for the system application A to the information processing device 10. Then, the download executor 104 downloads the first update file for the system application A, and the install executor 106 installs the downloaded first update file in the second region 120. As is understood from the above, in a case where an update file associated with the version information regarding the system software recorded in the first region 110 exists for download in the delivery server 12 (S20), the download executor 104 downloads the update file (S30).

Figure 5:
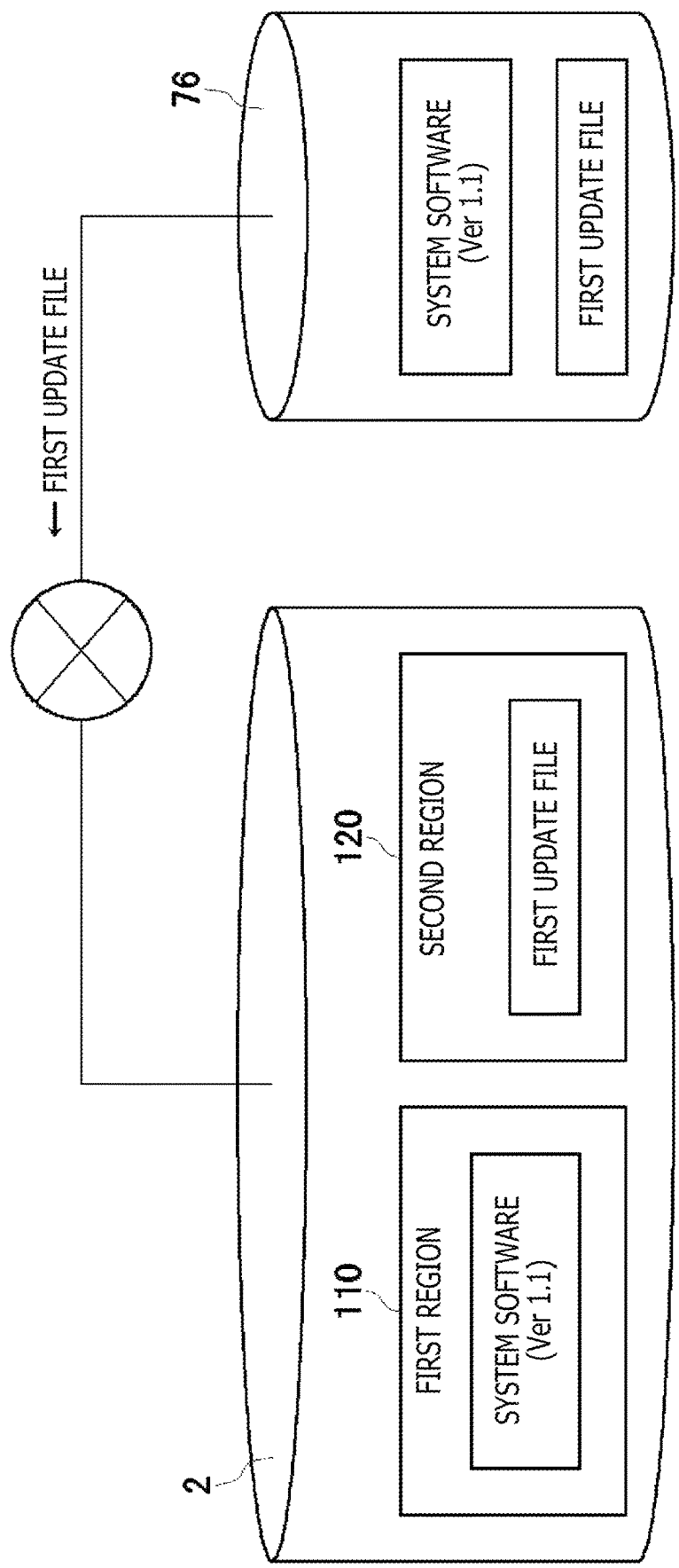
FIG. 5 illustrates a state where the first update file is installed in a second region.

FIG. 5 illustrates a state where the first update file for the system application A is installed in the second region 120. When the receiver 100 receives an execution request for the system application A from the user in this state, the function executor 102 executes the system application A by using the first update file recorded in the second region 120.

When the receiver 100 receives the execution request for the system application, the function executor 102 determines, with the use of a file system, whether or not an update file for the system application to be executed is recorded in the second region 120. If an update file is recorded in the second region 120, the function executor 102 executes the update file. The update file recorded in the second region 120, which is an update of the system application recorded in the first region 110, allows the user to use a new system application.

It should be noted that, in the example illustrated in FIG. 5, when the function executor 102 tries to execute the first update file, there is a possibility that the first update file, which is recorded in the writable second region 120, is corrupted. In a case where the first update file fails to be started for some reasons such as corruption, the function executor 102 executes the system application A incorporated in the system software recorded in the first region 110. The system software is recorded in the robust first region 110 and, consequently, the system application incorporated therein is stably maintained in an executable state.

Even after the first update file is recorded in the second region 120, the download executor 104 periodically inquires of the delivery server 12 whether or not there is any file to download. When obtaining the inquiry including the version information (Ver 1.1), the management unit 70 searches the storage device 76 for a latest update file for a system application that is to operate with the version 1.1 OS. In the example illustrated in FIG. 5, the management unit 70 recognizes the presence of the first update file for the system application A and notifies the information processing device 10 of a hash value of the first update file along with identification information regarding the system application A.

In the information processing device 10, the download executor 104 obtains the notified information and searches for the presence of an update file for the system application A having the notified hash value in the second region 120. In the state illustrated in FIG. 5, the first update file for the system application A exists in the second region 120. The download executor 104 then calculates a hash value of the first update file and compares it with the hash value notified from the delivery server 12. The hash values match each other at this time. Accordingly, the download executor 104 ascertains that downloading is not necessary, thus sending no download request for the first update file to the delivery server 12.

Figure 6:
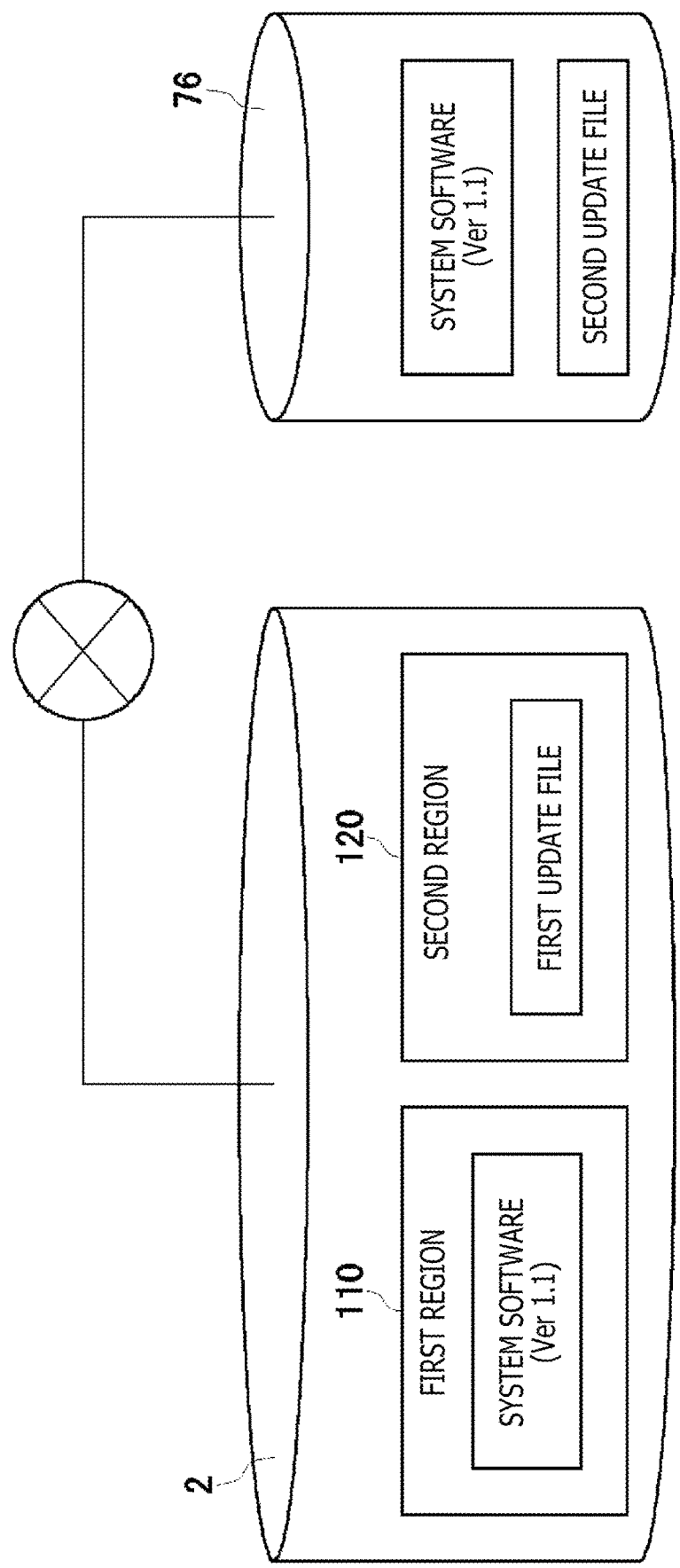
FIG. 6 illustrates a state where a second update file is held in the storage device.

FIG. 6 illustrates a state where the second update file for a system application is held in the storage device 76 of the delivery server 12. When the second update file is uploaded in the storage device 76 for delivery by the developer of the system application A, the old first update file is deleted from the storage device 76. At this time, the first update file for the system application A is recorded in the second region 120 of the auxiliary storage device 2.

The download executor 104 inquires of the delivery server 12 whether or not there is any file to download. When obtaining the inquiry including the version information (Ver 1.1), the management unit 70 searches the storage device 76 for a latest update file for a system application that is to operate with the version 1.1 OS. When recognizing the presence of the second update file for the system application A, the management unit 70 notifies the information processing device 10 of a hash value of the second update file along with identification information regarding the system application A.

In the information processing device 10, the download executor 104 obtains the notified information and searches for the presence of an update file for the system application A having the notified hash value in the second region 120. In the state illustrated in FIG. 6, the first update file for the system application A exists in the second region 120. Accordingly, the download executor 104 calculates a hash value of the first update file and compares it with the hash value notified from the delivery server 12. In this case, the hash values do not match each other. Accordingly, the download executor 104 ascertains that no update file having the hash value notified from the delivery server 12 exists in the second region 120, thus sending a download request for the second update file to the delivery server 12.

The management unit 70 obtains the download request, and the second delivery unit 74 delivers the second update file for the system application A to the information processing device 10. Then, the download executor 104 downloads the second update file for the system application A, and the install executor 106 installs the downloaded second update file in the second region 120. As is understood from the above, if an update file existing in the delivery server 12 is different from an update file recorded in the second region 120, the download executor 104 downloads the update file from the delivery server 12.

The system software of the embodiment includes a plurality of system applications created by different developers. Versions of the system applications are managed according to rules of the respective developers, so that naming of version information is not standardized among the plurality of system applications. Accordingly, in determining whether or not downloading is to be performed, the download executor 104 performs the determination not by reference to the version information regarding the update file but only based on whether or not the hash values match each other.

Figure 7:
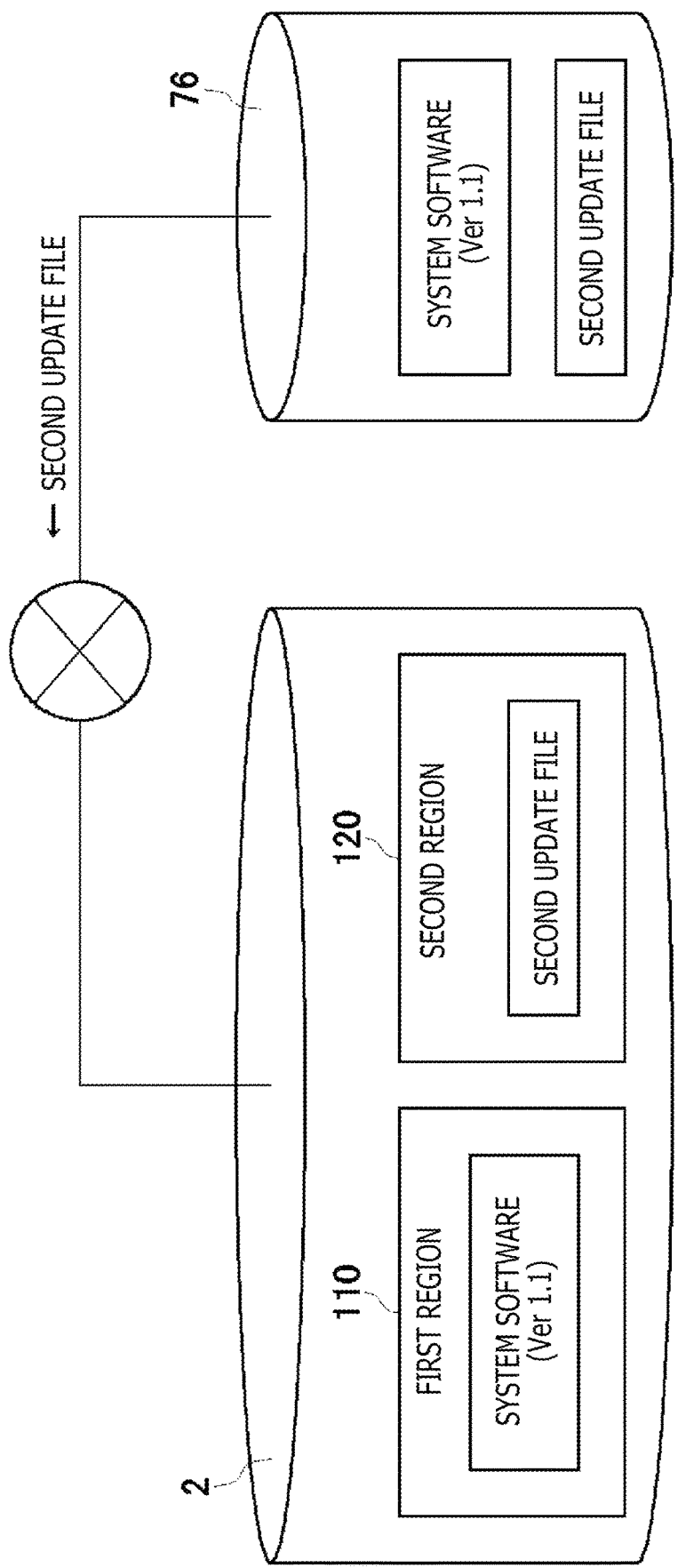
FIG. 7 illustrates a state where the second update file is held in the second region.

FIG. 7 illustrates a state where the second update file for the system application A is installed in the second region 120. The install executor 106 may overwrite-install the second update file in the second region 120. If the receiver 100 receives an execution request for the system application A from the user in this state, the function executor 102 executes the system application A by using the second update file recorded in the second region 120.

Figure 8:
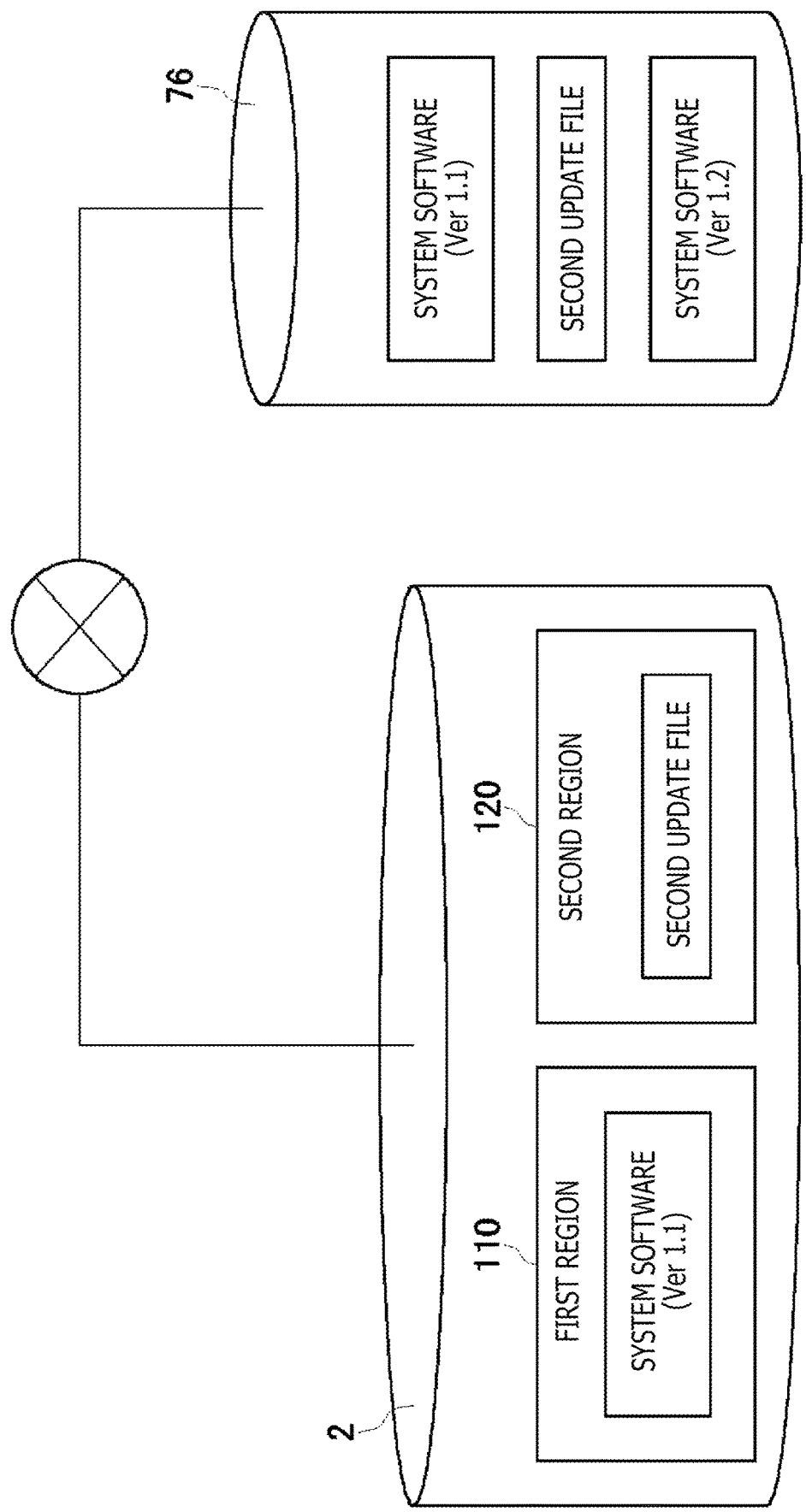
FIG. 8 illustrates a state where an update package for system software is held in the storage device.

FIG. 8 illustrates a state where an update package for version 1.2 system software is held in the storage device 76 of the delivery server 12. At this time, the version 1.1 system software is recorded in the first region 110 of the auxiliary storage device 2.

In inquiring of the delivery server 12 whether or not there is any file to download, the download executor 104 also inquires a latest version of the system software. In response to the inquiry regarding the version of the system software, the management unit 70 notifies the information processing device 10 of latest version information (Ver 1.2) regarding the system software.

In the information processing device 10, the download executor 104 compares, when obtaining the notified version information regarding the system software, the notified version information with the version information regarding the system software recorded in the first region 110. There is a predetermined rule for naming of a version of the system software. The download executor 104 determines whether or not an update package that is newer than the system software recorded in the first region 110 is downloadable according to this rule. If the version information matches it, the download executor 104 determines that downloading is not necessary. If the notified version information is newer, the download executor 104 sends a download request for the system software to the delivery server 12.

The management unit 70 obtains the download request for the system software, and the first delivery unit 72 delivers the update package for the system software to the information processing device 10. Thus, the download executor 104 downloads the update package for the version 1.2 (S50), and the install executor 106 installs the downloaded version 1.2 system software in the first region 110(S60).

Figure 9:
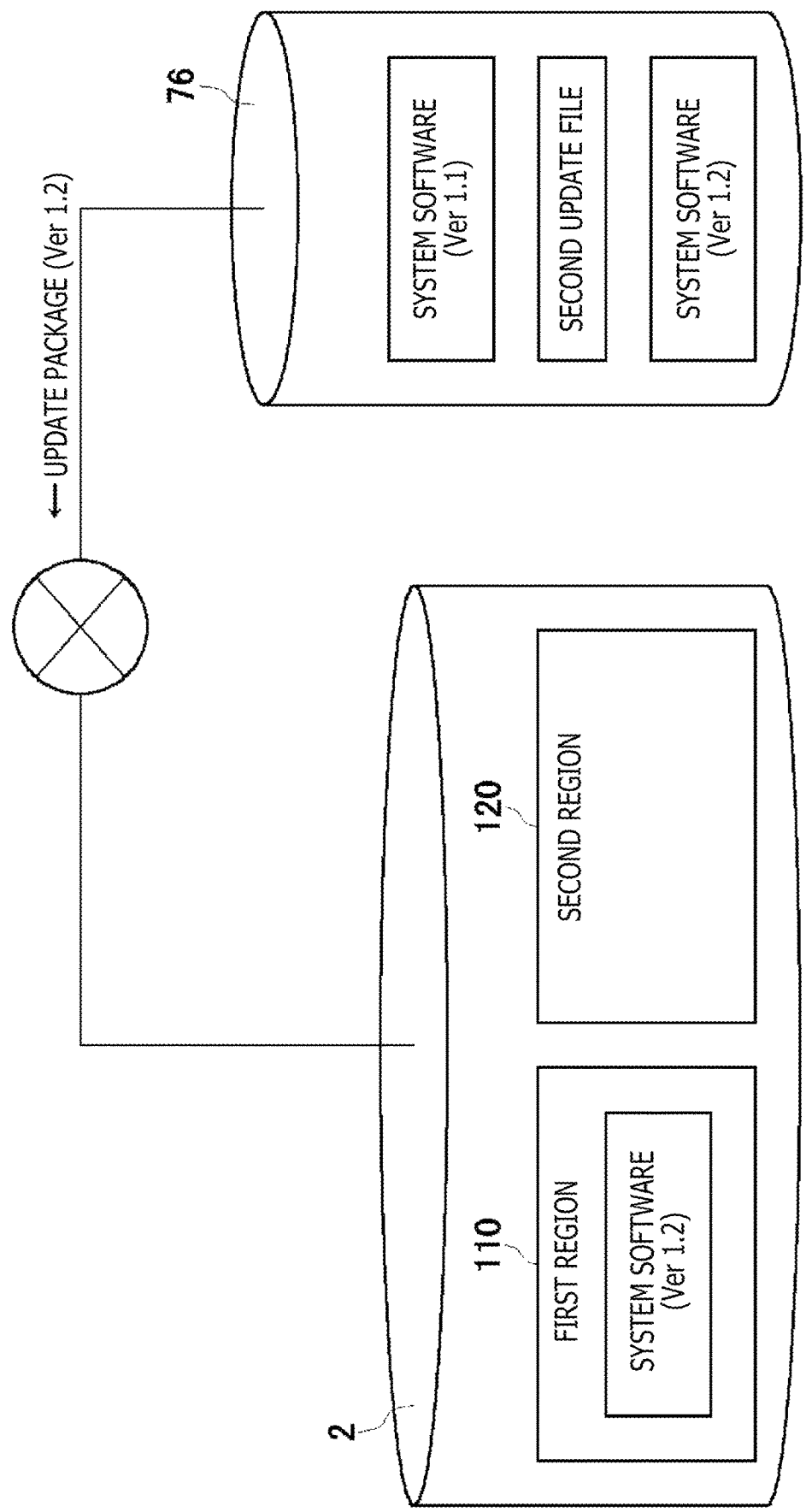
FIG. 9 illustrates a state where system software is installed in a first region.

FIG. 9 illustrates a state where the version 1.2 system software is installed in the first region 110. The first region 110 can be rewritten only with an update package for system software. The install executor 106 may overwrite-install the version 1.2 system software in the first region 110. When installing the update package in the first region 110 (S60), the install executor 106 uninstalls the update file recorded in the second region 120 (S70). Afterward, an update file for a system application that is to operate with a version 1.2 OS is to be installed in the second region 120.

The embodiment above is merely exemplary. Therefore, it should be understood by those skilled in the art that various modifications of the components and the combination of processes are possible and such modifications are also within the scope of the present invention. In the embodiment, description is made on the update of the single system application A. However, a plurality of system applications are actually to be updated. Further, in the embodiment, software to be recorded in the first region 110 is system software. However, any other types of software such as a game application are also possible.

INDUSTRIAL APPLICABILITY

The present invention is applicable to a technical field where a function of software is to be updated.

REFERENCE SIGNS LIST

1: Information processing system
2: Auxiliary storage device
10: Information processing device
12: Delivery server
70: Management unit
72: First delivery unit
74: Second delivery unit
76: Storage device
100: Receiver
102: Function executor
104: Download executor
106: Install executor
110: First region
120: Second region

The invention claimed is:

1. An information processing device configured to access a first region for recording software that implements a plurality of functions and a second region for
  recording an update file for each of the functions of the software, the information processing
  device comprising:
    circuitry configured to execute the functions of the software,
    and on condition that the update file for a function to be executed is recorded in the second region, the circuitry is configured to execute the update file,
    wherein
    the first region and the second region are different partitions of a same auxiliary storage device, and
    the first region is a user-unwritable region and the second region is a user-writable region,
  wherein the circuitry is further configured to:
    download the update file for each of the functions of the software from a delivery server,
    on condition that an update file associated with version information regarding the software recorded in the first region exists for download in the delivery server,
    download the update file associated with the version information,
    install the downloaded update file in the second region,
    download an update package for the software, and
    uninstall, when installing the update package in the first region, any update file recorded in the second region.

2. The information processing device according to claim 1,
  the first region is configured to be updated with the update package for the software.

3. The information processing device according to claim 1, wherein, if an update file existing in the delivery server is different from the update file recorded in the second region, the circuitry is configured to download the update file from the delivery server.

4. The information processing device according to claim 1,
wherein the software is system software, and
a function provided by the system software is implemented by an application.

5. A delivery server configured to deliver a file for software to an information processing device, the delivery server comprising:
a first delivery circuit configured to deliver an update package for the software that implements a plurality of functions;
a management circuit configured to obtain version information regarding the software from the information processing device; and
a second delivery circuit configured to deliver an update file for each of the functions of the software according to the obtained version information,
wherein a first region for recording the software that implements the plurality of functions and a second region for recording the update file for each of the functions of the software are different partitions of a same auxiliary storage device, and
the first region is a user-unwritable region and the second region is a user-writable region,
wherein the second delivery circuit is further configured to:
on condition that an update file associated with version information regarding the software recorded in the first region exists for download in the delivery server,
deliver the update file associated with the version information, wherein, in response to delivery of the updated file, the delivered updated file is downloaded and installed in the second region, and
deliver the update package for the software, wherein, in response to delivery of the updated package, any update file recorded in the second region is uninstalled, when installing the update package in the first region.

6. A method of executing a function of software in an information processing device, the information processing device being configured to access a first region for recording the software that implements a plurality of functions and a second region for recording an update file for each of the functions of the software, the method comprising:
executing, if the update file for a function to be executed is recorded in the second region,
the update file, wherein the first region and the second region are different partitions of a same auxiliary storage device, and
the first region is a user-unwritable region and the second region is a user-writable region,
downloading the update file for each of the functions of the software from a delivery server,
determining whether the update file associated with version information regarding the software recorded in the first region exists for download in the delivery server,
downloading the update file associated with the version information in response to determining that an update file exists,
installing the downloaded update file in the second region,
downloading an update package for the software, and
uninstalling, when installing the update package in the first region, any update file recorded in the second region.

7. The method according to claim 6, wherein the first region is configured to be updated with an update package for the software.

8. The method according to claim 6, further comprising downloading the update file from the delivery server if an update file existing in the delivery server is different from the update file recorded in the second region.

9. A non-transitory computer readable medium having stored thereon a program for a computer, wherein, when the program is executed by the computer, causes the computer to
to access a first region for recording software that implements a plurality of functions and a second region for recording an update file for each of the functions of the software,
wherein, if the update file for a function to be executed is recorded in the second region, the update file is executed, wherein the first region and the second region are different partitions of a same auxiliary storage device, and
the first region is a user-unwritable region and the second region is a user-writable region,
wherein the computer is further configured caused to:
download the update file for each of the functions of the software from a delivery server,
on condition that an update file associated with version information regarding the software recorded in the first region exists for download in the delivery server,
download the update file associated with the version information,
install the downloaded update file in the second region,
download an update package for the software, and
uninstall, when installing the update package in the first region, any update file recorded in the second region.

* * * * *